US010248625B2

(12) United States Patent
Jadhav et al.

(10) Patent No.: US 10,248,625 B2
(45) Date of Patent: Apr. 2, 2019

(54) ASSURANCE-ENABLED LINDE BUZO GRAY (ALBG) DATA CLUSTERING

(71) Applicant: Tata Consultancy Services Limited, Mumbai (IN)

(72) Inventors: Sandip Jadhav, Pune (IN); Akshay Kumar Singhal, Pune (IN); Mohan Raj Velayudhan Kumar, Pune (IN); Rahul Ramesh Kelkar, Pune (IN); Harrick Mayank Vin, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 512 days.

(21) Appl. No.: 15/019,636

(22) Filed: Feb. 9, 2016

(65) Prior Publication Data

US 2016/0371362 A1    Dec. 22, 2016

(30) Foreign Application Priority Data

Jun. 19, 2015   (IN) .......................... 2350/MUM/2015

(51) Int. Cl.
| | |
|---|---|
| G06F 16/00 | (2019.01) |
| G06F 16/28 | (2019.01) |
| G06F 16/23 | (2019.01) |
| G06K 9/62 | (2006.01) |
| G06F 17/30 | (2006.01) |
| G06F 16/35 | (2019.01) |

(52) U.S. Cl.
CPC ........ *G06F 16/285* (2019.01); *G06F 16/2365* (2019.01); *G06F 17/30371* (2013.01); *G06F 17/30598* (2013.01); *G06K 9/6222* (2013.01)

(58) Field of Classification Search
CPC ....... G06F 16/35; G06F 16/353; G06F 16/355
USPC ......................................................... 707/737
See application file for complete search history.

(56) References Cited

U.S. PATENT DOCUMENTS

| | | | |
|---|---|---|---|
| 5,901,247 A * | 5/1999 | Osbourn .............. | G06K 9/6293 382/209 |
| 8,402,027 B1 | 3/2013 | Dange et al. | |
| 9,324,036 B1 * | 4/2016 | Iyer ...................... | G06N 99/005 |

(Continued)

*Primary Examiner* — Hanh B Thai
(74) *Attorney, Agent, or Firm* — Finnegan, Henderson, Farabow, Garrett & Dunner LLP

(57) ABSTRACT

Methods and systems for Assurance-enabled Linde Buzo Gray (ALBG) data clustering is described herein. In an implementation, a user model data from a database available to the processor is obtained. The user model data comprises data elements or users, each of which corresponds to features and feature values associated with the users. These data elements of the user model data are segmented into clusters using our segmentation approach with an initial accuracy criterion parametric value and the output is captured as segment data. The segment data output is checked for initial pareto validity. If successful, iterative segmentation run with incremental accuracy criterion using parameterized value is performed till the segmented clusters are determined valid against pareto validity check. The last successful pareto valid segmented cluster data is considered as the finalized segment output data. For an invalid initial pareto validity check, a segmentation run with a pre-determined accuracy criterion value is done to arrive at the finalized segment output data.

15 Claims, 3 Drawing Sheets

(56) References Cited

U.S. PATENT DOCUMENTS

2015/0208053 A1\* 7/2015 Hubin .................... H04N 5/765
                                                                      386/248
2016/0283533 A1\* 9/2016 Urmanov .......... G06F 17/30598

\* cited by examiner

ASSURANCE-ENABLED LINDE BUZO GRAY (ALBG) DATA CLUSTERING

PRIORITY CLAIM

This U.S. patent application claims priority under 35 U.S.C. § 119 to: India Application No. 2350/MUM/2015, filed on Jun. 19, 2015. The entire contents of the aforementioned application are incorporated herein by reference.

TECHNICAL FIELD

This disclosure relates generally to data processing, and more particularly to a method and a system for Assurance-enabled Linde Buzo Gray (ALGB) data clustering based segmentation.

BACKGROUND

Clustering is an important module in user segmentation solution methodology. At a high level, clustering deals with finding a structure in a collection of unlabeled data. Clustering is a statistical concept for identifying interesting distribution patterns and similarities between objects (users) in a data set. It is an optimization problem that seeks to classify objects (users) based on their proximity to one another. In this sense, objects (users) that are most similar are grouped together forming groups of similar objects (users) referred to as clusters. Clustering tasks involve generating clusters that are compact and well-separated from one another. A cluster is therefore a collection of objects (users) which are "similar" between them and are "dissimilar" to the objects (users) belonging to other cluster(s). Based on approach, clustering can be classified as either supervised or unsupervised. Supervised uses training data or seed data to drive or control the cluster formation and unsupervised does not require any seed value or training/learning phase.

Conventional approaches rely on sampling the dataset a pre-determined number of times and generating clusters associated with the samples. These sampling-based approaches suffer from lack of replicability, since the resultant clusters are highly susceptible to bias based on the initial sampling and the number of samples. Still other clustering approaches rely on segmenting the data based on business rules. These rule-based approaches also suffer from bias based on the original selection of the business rules. User segmentation helps group users into clusters who exhibit similar requirement characteristics. Effective segmentation allows organization to focus on user's requirements in a cost effective yet exhaustive way. This helps in taking a strategic decision for a particular group of users and also it helps in identifying the type of required resources to the group and helps to have a cost estimation to provide the required framework for the clusterization.

SUMMARY

Embodiments of the present disclosure present technological improvements as solutions to one or more of the above-mentioned technical problems recognized by the inventors in conventional systems.

The present application provides a method and system for assurance-enabled linde buzo gray (ALBG) data clustering based segmentation.

The present application provides a method and system for assurance-enabled linde buzo gray (ALGB) data clustering based segmentation; said system comprising a processor, a user data module coupled to the processor configured to obtain a user model data from a database, the user model data comprising data elements corresponding to features and feature values of users and obtaining a segmented data output comprising clusters of the user model data of the users; a pareto validation module adapted to determine validity of the segmented data output against pareto validity check; a segmentation module adapted to iteratively segment the data elements of the user model data into segmented clusters using an accuracy cluster criterion value, till the segmented clusters are determined valid against the pareto check; a qualitative assurance module adapted to perform qualitative assurance of the segmented clusters to ensure that each of the data elements is correctly assigned to the segmented clusters; and a database configured to store the qualitative assured segmented clusters as a result of the quality assurance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
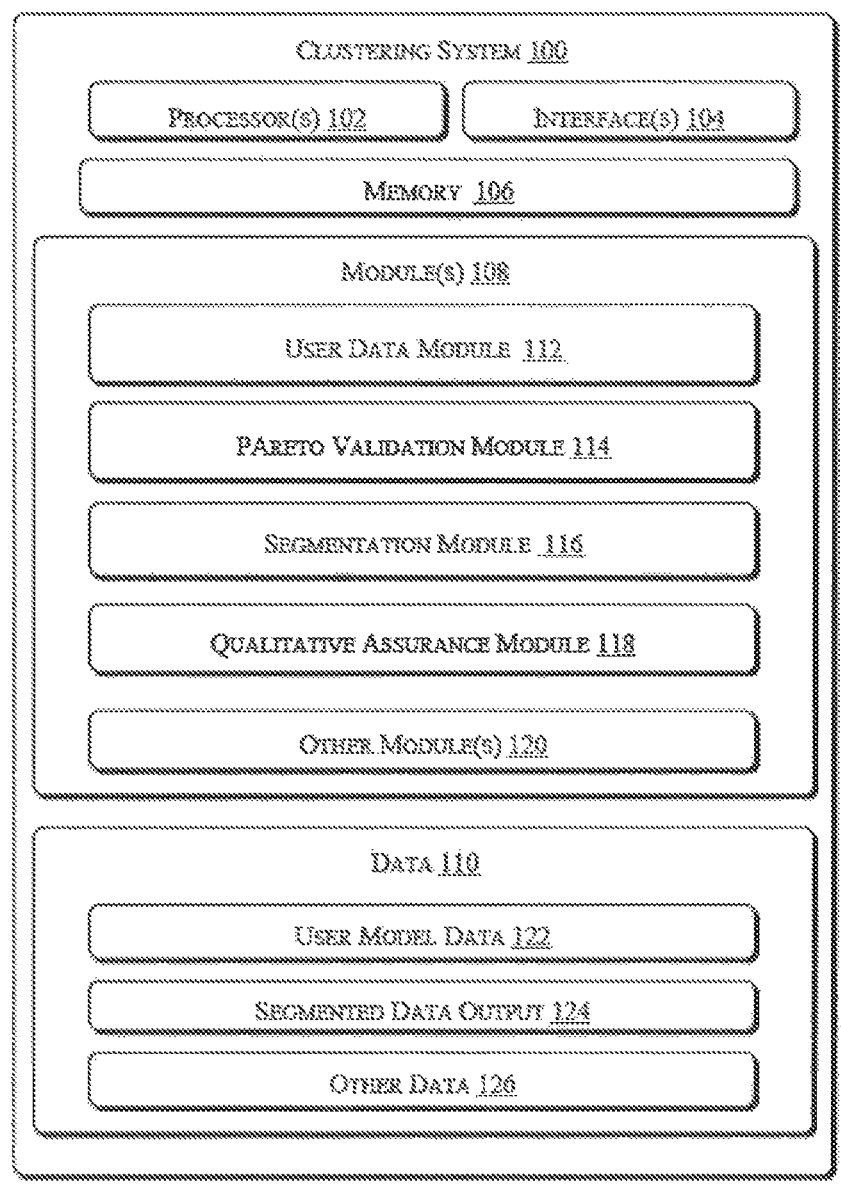
FIG. 1 illustrates a clustering system, according to an implementation of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The subject matter disclosed herein relates to method(s) and system(s) for Assurance-enabled Linde Buzo Gray (ALBG) data clustering based segmentation. For the purposes of the present subject matter, grouping refers to an act of segmenting or clustering people or users performing a number of tasks using computing devices in an organization. The users in the organization are commonly grouped automatically based on two aspects: features and feature values. Feature is an abstract of a requirement of the organization. The feature includes but not limited to, mobility, criticality, responsibility, security, functionality, personality, work load, and device ownership. Further, feature value indicates a level of feature possessed by an individual. For example, mobility feature of an individual can have feature values including high mobility, moderate mobility, and low mobility.

Grouping of the users in the organization is generally performed by segmenting or clustering the individuals based on the features and the feature values possessed by the users, so that the users can be provided with a right work space in the organization. Various techniques of clustering the users have been developed in past few years. Such conventional clustering techniques represent the users in the form of data elements using the features and the feature values. The conventional clustering techniques then groups data elements into two or more clusters such that, each of the clusters includes a collection of the users which have similar feature values between them and have dissimilar feature values to the users belonging to other cluster(s).

Such conventional clustering techniques, however, fail to determine whether the result or outcome of clustering process is correct or not. That is, the conventional clustering techniques fail to determine right number of possible clusters, right set of the users into the possible clusters and the cluster composition itself.

Few attempts have been made in the past to overcome the limitations of the conventional clustering techniques by modifying known k-means clustering algorithm. Although the modified k-means clustering algorithm has been used intensely for data clustering, owing to its simplicity of implementation, but providing a number of required clusters (k-value) apriori as a seed value does not translate into production of good quality clusters. Therefore, the modified k-means clustering algorithm also fails to provide qualitative assurance on the outcome of the data clustering.

To this end, various implementations described herein, in accordance with the present subject matter, provide methods and systems for grouping users through Assurance-enabled Linde Buzo Gray (ALBG) data clustering based segmentation. Clustering may be understood as partitioning or segmenting of data elements of a data set into a plurality of clusters, such that the data elements that belong to the same cluster are as similar as possible and are as dissimilar as possible to other cluster. The system as described herein is a clustering system.

In an implementation, a database for storing user model data for segmentation is maintained. In an example, the user model data has data elements. The data elements represent individuals or users of an organization with a set of features along with respective feature values. In an example, the users can be information technology (IT) users of the organization. According to an implementation, the data elements are represented by a plurality of data points in a multi-dimensional space, say n-dimensional space. Further, each of the plurality of data points may include a plurality of dimensions or components. The database can be an external repository associated with the clustering system, or an internal repository within the clustering system.

Further, the data elements contained within such database may be updated, whenever required. For example, new data elements may be added into the database, existing data elements can be modified, or non-useful data elements may be deleted from the database. Although it has been described that a database is maintained to store the data elements; however, it is well appreciated that the data elements may be retrieved by the clustering system in real-time to identify significant data elements, and then perform clustering of the data elements into clusters using k-means clustering algorithm. The k-means clustering algorithm is a popular procedure for data clustering. The k-means clustering algorithm assumes that the data or "individuals" to be clustered are available as points (or vectors) in an n-dimensional Euclidean space. The k-means algorithm seeks a minimum variance grouping of data that minimizes the sum of squared Euclidean distances from certain cluster centroids. The popularity of the k-means algorithm can be attributed to its relative ease of interpretation, implementation simplicity, scalability, convergence speed, adaptability to sparse data, and ease of out-of-core (out of the local memory of a single processor) implementation.

In an implementation, the clusters produced by the k-means algorithm are stored in the database as 'segmented data output' for a number of practical applications including, for example, unsupervised classification and taxonomy generation, nearest neighbor searching, scientific discovery, vector quantization, text analysis, and navigation.

In accordance with the present subject matter, the segmented data output stored in the database is retrieved and validated for pareto distribution using pareto validity check. The pareto validity check is a standard principle or logic for analyzing or validating any clustered or segmented result. In an example, the segmented data output from segmentation run with an accuracy cluster criterion is determined 'valid' against the pareto validity check when 20% of the clusters contain 80% of the users or data elements from the user model data.

In an example, the accuracy cluster criterion is co-efficient of ponderation (CoP) value. The CoP value signifies factor of safety value on quality that the segmented clusters can exhibit. For instance, the CoP value of 0.01 signifies 99% accuracy, whereas 0.02 signifies 98% accuracy of segmented clusters. Further, the CoP value and the accuracy are inversely proportional to each other.

Further, in an implementation, in case the segmented data output is validated against the pareto validity check, the segmented data output is further iteratively segmented with incremental accuracy criterion till the segmented clusters are determined valid. The iterative segmentation of the segmented data output is terminated at an iteration when the segmented clusters are determined invalid against the pareto validity check.

For instance, in an example, the iterative segmentation of the segmented data output is started with an initial CoP value as 0.01 and in each subsequent iteration it is incremented by 0.01. On determination of the segmented clusters as invalid against the pareto validity check for an iteration, the iterative segmentation is terminated at that iteration and last successfully validated segmented clusters for the pareto validity check are stored as the segmented data output in the database.

However, in an alternative example, if even for one iteration, the segmented clusters are found valid against pareto, then this output is considered as the segmented data output. Otherwise, the iterative segmentation of the segmented data output is run on the user model data with CoP value as 0.1, the resultant segment clusters are then considered as the segmented data output. The resulting segmented data output is the one on which quality assurance task would be run to have quality assured segmented data output.

Thus, with the implementation of the present subject matter, the method and the system facilitate control over a clustering technique to determine that whether result or outcome of the clustering technique is correct or not. Further, the method and the system uses the CoP value as only seed value for the clustering technique described herein for determining right number of possible clusters and right set of data elements into the possible clusters.

Further, the description hereinafter of the present subject matter includes various specific details to assist in understanding various aspects but these are to be regarded as merely exemplary. Accordingly, those of ordinary skill in the art will recognize that various changes and modifications of the embodiments described herein can be made without departing from the scope of the present subject matter. In addition, descriptions of well-known functions and constructions may be omitted for clarity and conciseness.

The terms and words used in the following description are not limited to the bibliographical meanings, but, are merely used to enable a clear and consistent understanding of the present subject matter. Accordingly, it should be apparent to those skilled in the art that the following description of exemplary embodiments or implementations of the present subject matter is provided for illustration purpose only and not for the purpose of limiting the present subject matter.

It should be noted that the description merely illustrates the principles of the present subject matter. It will thus be appreciated that various arrangements may also be employed that, although not explicitly described herein, embody the principles of the present subject matter and are included within its spirit and scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof. The manner in which the methods shall be implemented onto various systems has been explained in detail with respect to the FIGS. 1-3. While aspects of described systems and methods can be implemented in any number of different computing devices and/or configurations, the embodiments are described in the context of the following system(s).

FIG. 1 illustrates a clustering system 100, in accordance with an embodiment of the present subject matter. The clustering system 100 may be implemented in a variety of computing systems, such as a laptop computer, a desktop computer, a notebook, a workstation, a mainframe computer, a server, a network server, and the like.

In an implementation, the clustering system 100 includes processor(s) 102, interface(s) 104, and memory 106 coupled to the processor(s) 102. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 may be configured to fetch and execute computer-readable instructions stored in the memory 106.

The memory 106 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the interface(s) 104 may include a variety of software and hardware interfaces, for example, interfaces for peripheral device(s), such as a product board, a mouse, an external memory, and a printer. Additionally, the interface(s) 104 may enable the clustering system 100 to communicate with other devices, such as web servers and external repositories. The interface(s) 104 may also facilitate multiple communications within a wide variety of networks and protocol types, including wired networks, for example, LAN, cable, etc., and wireless networks, such as WLAN, cellular, or satellite. For the purpose, the interface(s) 104 may include one or more ports.

The clustering system 100 also includes module(s) 108 and data 110. The module(s) 108 include, for example, a user data module 112, a pareto validation module 114, a segmentation module 116, and a qualitative assurance module 118, and other module(s) 120. The user data module 112 captures a user's needs as a matrix of user and feature values. The pareto validation module 114 performs the pareto validity check on segmented clusters and users associated to the segmented clusters. The segmentation module 116 segments user model data into set of segmented clusters, with set of users or data elements mapped into each of the created segmented clusters. The other module(s) 120 may include programs or coded instructions that supplement applications or functions performed by the clustering system 100. The data 110 may include populated user model data 122, segmented data output 124, and other data 126. The other data 126, amongst other things, may serve as a repository for storing data that is processed, received, or specific CoP seed value references or generated as a result of the execution of one or more modules(s) 108.

In an implementation, the clustering system 100 further includes a database communicatively coupled to the clustering system 100, for storing the data 110. The database may store multi-dimensional data. The data may be representative of multimedia data, financial transactions and the like. According to the present implementation, the data is represented as a plurality of data points in a multi-dimensional space, say n-dimensional space. Although the database is described external to the clustering system 100, it will be appreciated by a person skilled in the art that the database can also be implemented internal to the clustering system 100, where the multi-dimensional data may be stored within a memory component of the clustering system 100.

In operation, the user data module 112 of the clustering system 100 may retrieve the multi-dimensional data or data elements from the database. In an example, the data elements represent users, for example, users of computing devices, of an organization with set of features along with respective feature values. In said example, the users can be information technology (IT) users of the organization. In view of this, the term data elements, users, and computing device users can be used interchangeably in the description hereinafter.

Further, the data elements may be n-dimensional data. As mentioned above, the data elements may be represented by a plurality of data points in a multi-dimensional space, say n-dimensional space. Further, each of the plurality of data points may include a plurality of dimensions or components.

According to an implementation, the data elements contained within the database may be updated, whenever required. For example, new data elements may be added into the database, existing data elements can be modified, or non-useful data elements may be deleted from the database. Although it has been described that the database is maintained to store the data elements; however, it is well appreciated that the data elements may be retrieved by the user data module 112 in real-time to identify significant user model data 122 or simply user data 122.

Once the user data 122 is collated by the user data module 112, clustering or segmentation run is performed by the segmentation module 116 on the user data 122 to determine clusters. Initially the total user data 122 is considered to be in one cluster called primary cluster $C_1$. In an implementation, the segmentation module 116 implements a modified k-means clustering algorithm. In the present subject matter, value of 'k' in the k-means clustering algorithm is taken or defined as 2 for each iteration. That is, the k-means clustering algorithm in the segmentation module 116 segments the user data 122 to two clusters, i.e., into the primary cluster $C_1$ and a secondary cluster $C_{M+1}$, where M is the number of clusters before running segmentation run.

In an implementation, the segmentation module 116 segments the primary cluster $C_1$ using n-dimensional Euclidean distance metric along with the k-means clustering algorithm. From the represented plurality of user data 122 in the n-dimensional space, the segmentation module 116 identifies a cluster center (centroid) $P_1$ and a fall-back referential user point FP for the primary cluster $C_1$. Cluster center is also known as a centroid of a cluster, and each cluster has its own centroid. Fall-back referential user point is a farthest point from the cluster center, and is also known as germ point or farthest point. Many times, the segmentation module 116 might not be able to perform a valid split using initial fall-back referential user point. In such cases, the segmentation module 116 may identify one or more secondary fall-back referential user points till there are no fall-back referential points left.

Based on the cluster center $P_1$ and the fall-back referential user point FP for the primary cluster $C_1$, the segmentation module 116 segments the primary cluster $C_1$ into two clusters using the k-means algorithm. With this step, the number of clusters in the clustering system 100 is incremented by 1; however, one of the two clusters is the primary cluster $C_1$ that is segmented and other is the secondary cluster $C_{M+1}$.

Thereafter, the segmentation module 116 assigns the data elements to the closest of the two clusters, i.e., the primary cluster $C_1$ and the secondary cluster $C_{M+1}$. Based on this assignment, a cluster center $P_{M+1}$ for the secondary cluster is computed. The process of assigning and computing are iteratively carried out until the cluster centers for the two clusters, i.e., the primary cluster $C_1$ and the secondary cluster $C_{M+1}$ become stable.

In the present subject matter described herein, the two clusters segmented by the segmentation module 116 are validated based on an evaluation criterion. In an implementation, the evaluation criterion is based on dispersion measure. The dispersion measure signifies the density of the cluster in terms of how dense or sparse the data elements are placed in that cluster. In general, the dispersion measure is higher if packing density of a cluster is lower and vice-versa.

Normally, the dispersion measure of a cluster, say cluster Ci, is given by:

$$DM(C_i) = \frac{1}{n_i} \sum_{j=1}^{N} dist(U_j, P_i) \quad (1)$$

where

UCM $(U_j, C_i) = 1$ dist $(U_j, P_i)$ is the Euclidian distance between user Uj and user represented by Pi $0 < i \leq M; \; 0 < j \leq N$ The elements of the equation (1) can be referred from Table 1.

TABLE 1

Notations

| Notation | Description | Representation | |
|---|---|---|---|
| U | Complete User set | U = [U1,U2, . . . ,UN] | where N is the total number of users |
| U1 | User U1 is represented in terms of set of features | U1 = [$F_1^1, F_1^2, F_1^3, \ldots, F_{ft}^1$] | where ft is a total number of features tied to a user $F_1^1, F_1^2, F_1^3, \ldots, F_{ft}^1$, are variables representing set of feature element values of user U1 |
| $F_k^i$ | kth Feature value of User Ui | | where $0 < i \leq N; 0 < k \leq ft$ |
| C | Complete cluster set | C = [C1, 2, . . . , CM] | where M is the total number of clusters created |
| Ci | ith Cluster containing set of users | Ci ← Ci ∪ {Uj}; ∀j | where $0 < j \leq N; 0 < i \leq M$ UCM(Uj, Ci) = 1; |
| UCM(Uj, Ci) | User to cluster Map | UCM$(U_j, C_i) \leftarrow \begin{cases} 1 & \text{if cluster } C_i \text{ contains user } U_j \\ 0 & \text{otherwise} \end{cases}$ | where $0 < i \leq M; 0 < j \leq N$ |
| ni | total number of users in cluster Ci | ni ← $\Sigma_{j=1}^{N}$ UCM(Uj, Ci) | where $0 < i \leq M;$ |
| centi | Centroid of cluster Ci | centi ← $\frac{1}{n_i} \sum_{j=1}^{N} F_k^j, \forall k$ | where UCM(Uj, Ci) = 1; $0 < i \leq M; 0 < k \leq ft$ |
| Pi | nearest user Uj to centi | | where UCM(Uj,Ci) = 1; $0 < i \leq M; 0 < j \leq N$ |

TABLE 1-continued

Notations

| Notation | Description | Representation | |
|---|---|---|---|
| a(j) | average dissimilarity with all other users Ui of cluster Ci | $a(j) \leftarrow \frac{1}{n_i} \sum_{k=1}^{N} dist(U_j, U_k)$ | where $k \neq j$; UCM(Uj, Ci) = 1; UCM(Uk, Ci) = 1; //same cluster |
| b(j) | minimum average dissimilarity between user Uj and rest of hte users in all the other clusters | $b(j) \leftarrow MIN\left(\frac{1}{n_1} \sum_{k=1}^{N} dist(U_j, U_k)\right)$ | where $k \neq j$; UCM(Uj, Ci) = 1; UCM(Uk, Ci) = 0; //different cluster |

In an implementation, if evaluation criterion as mentioned in below provided equation (2) is not satisfied, the segmentation module 116 identifies next fail back referential point in a primary cluster C1.

$$preDM - postDM > CoP \times postDM \quad (2)$$

where,
preDM is the dispersion measure of primary cluster; and
postDM is the cumulative sum of dispersion measure of the two segmented clusters.

When none of the fall back referential point satisfies the evaluation criterion, then cluster C1 is marked as not suitable for further split.

However, in case two clusters satisfy the evaluation criterion mentioned in the equation (2), the segmentation module 116 keeps these two clusters. In second iteration, one of the two clusters is selected by the segmentation module 116. In an example, the segmentation module 116 selects a cluster that has more dispersion measure than the other cluster and splits that selected cluster into two clusters using the k-means clustering algorithm and the n-dimensional Euclidean distance metric. As a result of this, total number of clusters created by the segmentation module 116 becomes three. Out of those three clusters, whichever cluster has more dispersion measure is again selected and further split using segmentation module 116. This procedure of selection and splitting will be iterated until all clusters cease to exhibit any further valid segmentation split. Further, clusters resulting from iterations are stored in the database as segmented data output 124 for a number of practical applications including, for example, unsupervised classification and taxonomy generation, nearest neighbor searching, scientific discovery, vector quantization, text analysis, and navigation.

In accordance with the present subject matter, the segmented data output 124 stored in the database may be retrieved whenever validity of the segmented data output 124 is to be determined. In one implementation, the validity of the segmented data output 124 is determined against a pareto validity check by the pareto validation module 114. The pareto validity check is a standard principle for analyzing or validating any clustering or segmenting. In an example, the segmented data output is determined 'valid' against the pareto check when 20% of the clusters contain 80% of data elements of the user data 122.

In an implementation, in case the segmented data output 124 is determined valid against the pareto validity check by the pareto validation module 114, the segmentation module 116 iteratively segments the data elements of the user data 122 into non-overlapping, increasingly refined, segments. Further, after each iteration of the iterative segmentation, the pareto validation module 114 determines the validity of resulting segmented clusters against the pareto validity check. If the resulting segmented clusters are determined valid against the pareto validity check by the pareto validation module 114, the segmentation module 116 increments the CoP value by 0.01 and segments the user data 122 for the incremented CoP value. However, as can be appreciated by a skilled person, the increase in the CoP value may decrease accuracy of the resulting segmented clusters. For example, for a CoP value of 0.02 signifies the accuracy of 98% whereas CoP value of 0.01 signifies the accuracy of 99%. The rationale to increase CoP value is to ultimately reduce the number of clusters created by the segmentation module 116, but with an acceptable loss in accuracy. Typically, an enterprise would have a hard limitation on the number of segments that can be accommodated owing to cost optimality. As can be appreciated by those skilled in the art, no enterprise is interested in having 100 or 1000 clusters, as these clusters may require further clustering for providing a right work place to a user in the enterprise.

In an example, the iterative segmentation is performed, till the resulting segmented clusters are determined valid against the pareto validity check. Thereafter, the resulting segmented clusters are stored as segmented data output 124 in the database. In an alternative example, the iterative segmentation is terminated at an iteration at which the resulting segmented clusters are determined invalid against pareto validity check. On determination of the resulting segmented clusters invalid against the pareto validity check for an iteration, the iterative segmentation is terminated at that iteration and whatever were the last successfully validated segmented clusters against the pareto validity check are stored as the finalized segmented data output 124 in the database.

Further, in an alternative implementation, in case the segmented data output 124 is determined invalid against the pareto validity check at the first segmentation run iteration by the pareto validation module 114, the segmentation module 116 initializes a predetermined CoP value for segmenting of the user data 122. Then, the segmentation module 116 performs a single segmentation of the data elements of the user data 122 with the predetermined CoP value for generating resulting segmented clusters. The resulting segmented clusters are stored as the finalized segmented data output 124 in the database. In an example, the predetermined CoP value is 0.1.

Thereafter, once the segmentation is done, quality assurance of the finalized segmented data output 124 is performed by the qualitative assurance module 118. One of the challenges with clustering technique described herein is to ensure that no data element (or user) Uj in complete data set U (user data 122) is assigned to wrong cluster, i.e., the data element Uj should not belong to a cluster which it should not. Details of notations used are captured in Table 1.

For instance, at second iteration, there are two clusters C1 and C2 with 20 and 30 data elements and centroid cent1 and cent2 respectively. Now at next iteration cluster C2 splits to C2' and C2" with 19 and 11 data elements and centroid cent2' and cent2" respectively. Further, let's assume that there may be a data element Uj in the cluster C1 that is closer to centroid cent2" of other cluster C2. Since there was no choice for that data element Uj to be assigned to the other cluster C2" in the second iteration, that data element Uj has been assigned to wrong cluster. Thus, there is a possibility of assigning that data element Uj to a wrong cluster. With respect to segmentation requirements, it is essential to assign all data elements U to correct cluster. Though this situation depends on the data elements U, having an assurance mechanism would ensure correctness. Details of notations used are captured in Table 1.

In order to eliminate this possibility of wrongly assigning the data elements, the present subject matter has proposed a silhouette co-efficient index level correction routine to correctly cluster the user data 122. If some of the data elements or users are assigned to wrong clusters, based on silhouette coefficient index value they are reassigned to correct clusters. Details of the silhouette coefficient index are captured in following description provided herein.

In an implementation, the qualitative assurance module 118 performs the quality assurance of the segmented clusters by determining a goodness quality of the segmented clusters using the silhouette co-efficient index. The silhouette co-efficient index, in general, refers to a method of interpretation and validation of data clusters. The silhouette co-efficient index provides a representation of how well each data element lies within its cluster. Further, the silhouette co-efficient index is also used to determine goodness quality of the segmented clusters created using the clustering system 100.

In an implementation, the silhouette co-efficient index comprises one of a silhouette co-efficient index specific to user, a silhouette co-efficient index specific to cluster, and a global silhouette co-efficient index.

In an example, the Silhouette coefficient index specific to user has a value ranging from −1 to +1 and that value is particularly useful when seeking to know the number of segmented clusters that will produce compact and clearly separated segmented clusters. The silhouette coefficient index specific to a user Uj (data element) of a cluster Ci is defined as:

$$qU_j \leftarrow \frac{a(j) - b(j)}{MAX[a(j), b(j)]}; \forall_j \quad (3)$$

where, details of the notations used are captured in Table 1.

As per equation 3, the silhouette co-efficient index qUj for each user in a cluster or segment is simply a measure of how similar that user is to users in its own cluster compared to users in other clusters. The silhouette co-efficient index has a value ranging from −1 to +1. Significance of this value is as follows:

Value closer to 1 indicates that the user or data element is rightly clustered;

Value if zero, indicates the assignment might be reassigned to another cluster. But, it's not incorrect in its current assignment; and Negative value indicates that the user or data element is assigned to incorrect cluster.

Further, when a user or data element has negative silhouette co-efficient index value, the qualitative assurance module 118 reassigns the user or the data element to the closest neighboring cluster, i.e., assigning the user or data element to correct cluster.

Further, in an example, the silhouette co-efficient index $qC_i$ specific to cluster is calculated for a given cluster Ci. The silhouette co-efficient index $qC_i$ specific to cluster characterizes heterogeneity and isolation properties of such given cluster:

$$qC_i \leftarrow \frac{1}{n_i} \sum_{j=1}^{N} qU_j; \forall_j \quad (4)$$

where, UCM(Uj, Ci)=1

As per equation (4), the silhouette co-efficient index qCi for each cluster Ci is simply a cluster level silhouette. qCi is submission of $qU_j$ for all the users in clusters Ci. In an example and as mentioned in Table 1, UCM (Uj, Ci) is user to cluster mapping.

Yet further, in an example, the global silhouette co-efficient index, for any user set U or data set, has a value qG that can be used as an effective validity index for the user set U.

$$qG \leftarrow \frac{1}{M} \sum_{i=1}^{M} qC_i \quad (5)$$

where, details of the notations used are captured in Table 1.

Therefore, in accordance with the present subject matter, the silhouette co-efficient index is used to perform qualitative assurance of the segmented data output 124, because the silhouette co-efficient index offers the advantage that it only depends on actual segmentation of the data elements, and not on clustering technique or algorithm that was used to obtain it. As a consequence, the silhouette co-efficient index could be used to improve the results of clustering technique or algorithm, for instance, by moving a data element with negative silhouette co-efficient index to its closest neighboring cluster or to compare an output of different clustering technique or algorithm applied to the same data elements.

The clustering technique described herein, in accordance with the present subject matter, provide methods and systems for grouping users using Assurance-enabled Linde Buzo Gray (ALBG) data clustering. Pseudo code for the ALBG data clustering and its sub modules are provided below:

Pseudo Code for ALBG

Pseudocode 1

Controlled Clustering ALBG Approach

| Input | U; | //complete user set |
|---|---|---|
| | CoP ← 0.01; | //initial COP for the segmentation run |
| Output | Segmentation result: SR | |
| Steps | Details | |
| A | 1. SR ← segmentationModule(U, CoP); | |
| | 2. IF ( paretoValidationModule(SR) == false) THEN | |
| | 3.   IF( CoP == 0.01) THEN | |
| | 4.     CoP ← 0.1; | |
| | 5.   ELSE | |
| | 6.     CoP ← CoP − 0.01; | |
| | 7.   END IF | |
| | 8.   SR ← segmentationModule(U, CoP); | |
| | 9.   SR ← qualityAssuranceModule (U, SR); | |
| | 10.   Return SR | |
| | 11. ELSE | |
| | 12.   CoP ← CoP + 0.1; | |
| | 13.   SR ← segmentationModule(U, CoP); | |
| | 14. END IF | |
| | 15. Go to Line 2 | |

Pseudocode 2

Segmentation Module

| Input | U; | //complete user set |
|---|---|---|
| | CoP; | //COP for the segmentation run |
| Output | Segmentation result: SR | |
| Steps | Details | |
| A | Initialize: | |
| | M ← 1; | //initial number of clusters |
| | unSplitableClusterId ← {∅}; | //clusters which cannot be split further |
| | exceptionFPk ← {∅}; | |
| | $C_1$ ← U; | //cluster farthest point that cannot be considered further |
| | C = [$C_1$]; | //initially complete user set is considered as a single cluster<br>//complete cluster set is initially considered to have one single cluster |
| B | user segment identification for split | |
| | 1. ∀ cluster $C_k$ in C (excluding clusters pointed by unSplitableC<br>   ∀k; where 0 < k ≤ M); | |
| | 2. IF($C_k$ = ∅)THEN //Exit criteria<br>   return SR | |
| | 3. ENDIF | |
| | 4. $C_k$ as primary cluster to be subdivided | |
| | 5. Find centroid $cent_k$ of $C_k$ | |
| C | Fall-back referential user identification in $C_k$ | |
| | 1. Find farthest point FP (excluding $exceptionFP_k$) from $P_k$ (or $cent_k$) in $C_k$ | |
| | 2. IF (FP = ∅) THEN | |
| | 3.   unSplitableClusterId ← {unSplitableClusterId ∪ k} | |
| | 4.   Go to Step B: | |
| | 5. ENDIF | |
| D | Cluster | |
| | 1. $$preDM \leftarrow \frac{1}{M}\sum_{j=1}^{M} DM(C_j)$$ | |
| | 2. cluster $C_k$ with $P_k$ and FP into $C_k$ and $C_{M+1}$ | |
| | 3. $$postDM \leftarrow \frac{1}{M+1}\sum_{j=1}^{M+1} DM(C_j)$$ | |
| E | validate the cluster split | |
| | 1. val1 ← preDM − postDM | |
| | 2. val2 ← CoP × postDM | |
| | 3. IF val1 > val2 THEN //Evaluation criteria | |
| | 4.   C ← {C ∪ $C_{M+1}$} | |
| | 5.   M ← size(C) | |
| | 6.   SR ← {C} | |
| | 7.   Go to Step B: //Valid split | |
| | 8. ELSE | |
| | 9.   $exceptionFP_k$ ← {$exceptionFP_k$ ∪ FP} | |
| | 10. ENDIF | |
| | 11. Go to Step C: | |

Pseudocode 3

Pareto Validation Module

| Input | Segmentation result: SR | |
|---|---|---|
| Output | True | //if the segmentation result is valid against pareto validity check |
| | or | |
| | False | //if the segmentation result is invalid against pareto validity check |
| Steps | Details | |
| A | validate the cluster result against 80-20 Pareto validity check | |
| | 1. Sort the clusters C based on user count ($C_i$ in terms of cluster size $n_i$) in descending order | |
| | 2. clustersConsidered ← Floor(M × 0.2) //count of 20% of clusters | |
| | 3. count ← 0 | |
| | 4. userCount ← 0 | |
| | 5. ∀ cluster $C_k$ in C (sorted by descending user count order) | |
| | 6.   IF(count < clustersConsidered) THEN | |
| | 7.     userCount ← userCount + $n_k$ | |
| | 8.   ENDIF | |
| | 9.   count ← count + 1 | |
| | 10. ∀ END | |
| | 11. IF$\left(\frac{userCount}{N} \geq .08\right)$THEN | |
| | 12.   Return True | |
| | 13. ELSE | |
| | 14.   Return False | |
| | 15. ENDIF | |

Pseudocode 4

Quality Assurance Module

| Input | U; | //complete user set |
|---|---|---|
| | Segmentation result: SR | |
| Output | Segmentation result: SR | |
| Steps | Details | |
| A | Qualitative assurance on the cluster result | |
| | 1. ∀ user $U_j$ in U; | |
| | 2. IF($U_j$ = ∅ )THEN //Exit criteria | |
| | 3.   Return SR | |

-continued

```
  4. ENDIF
  5. FIND qU_j
  6. IF(qU_j < 0 ) THEN //User is misclassified
  7.    Reassign User U_j to the closest neighbour cluster
  8.    Realign SR
  9. ENDIF
 10.∀ END
 11. Return SR
```

Figure 2:
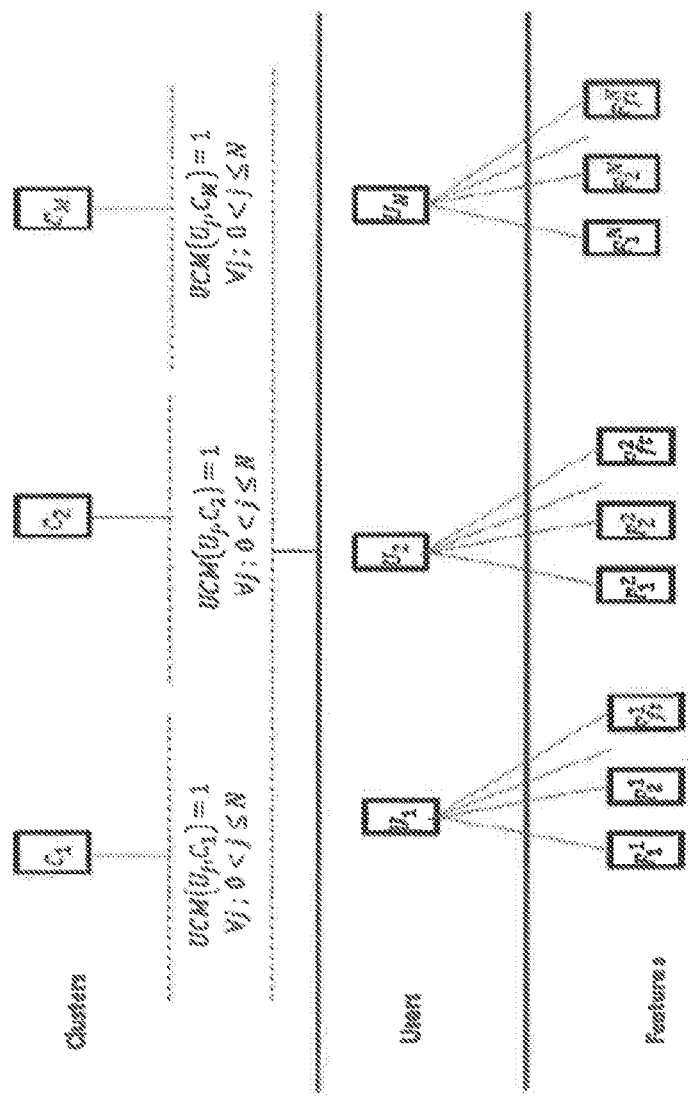
FIG. 2 illustrates a data model representing clusters of various distinct users, according to an implementation of the present subject matter.

FIG. 2 illustrates a data model representing clustered data of various distinct individual, according to an implementation of the present subject matter. As can be seen from FIG. 2, a user set U includes users U1, U2, . . . , UN. Further, each of the users is represented in terms of set of features. For example, a user U1 is represented with features $F_1^1$, $F_2^1$, $F_3^1$, . . . , $F_{fl}^1$. Yet further, clusters C1, C2, . . . , CM are qualitative assured clusters having valid user to cluster mapping based on the silhouette co-efficient index.

Figure 3:
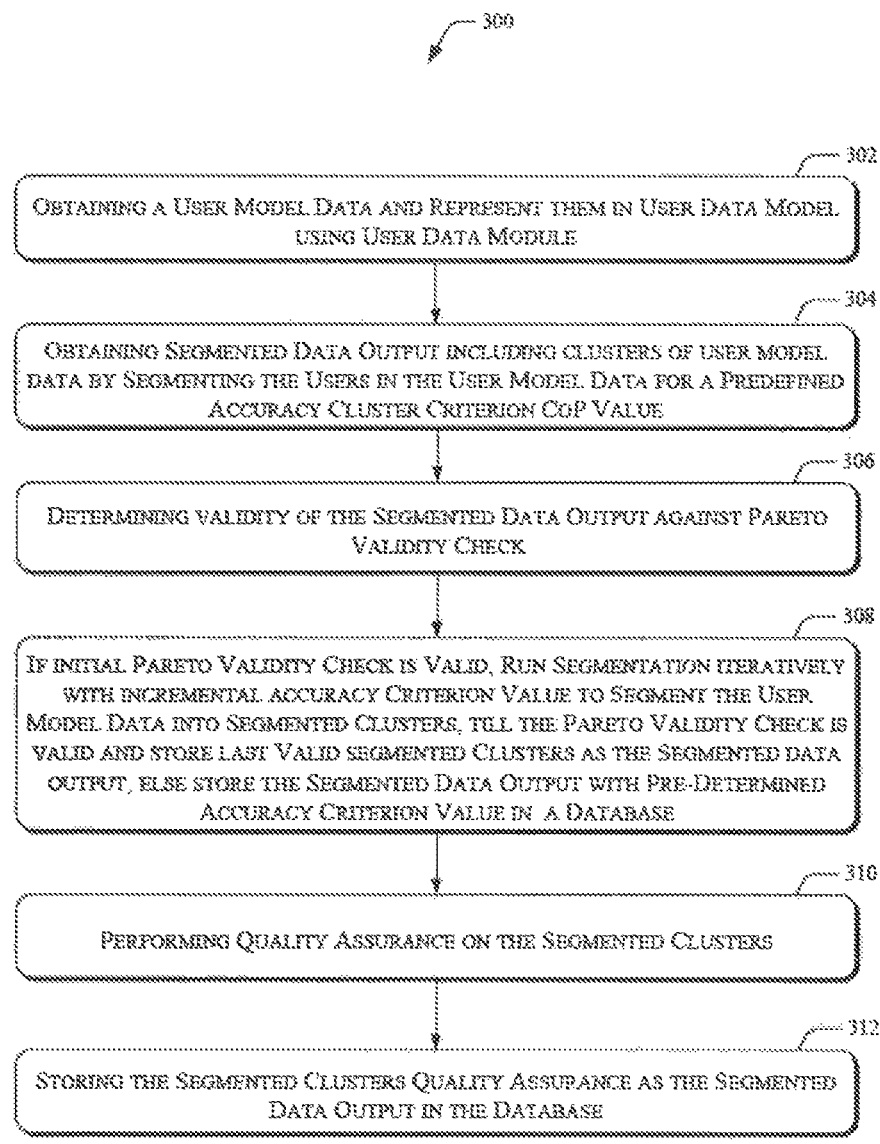
FIG. 3 illustrates a method for grouping users through Assurance-enabled Linde Buzo Gray (ALBG) data clustering based segmentation, according to an implementation of the present subject matter.

FIG. 3 illustrates a method 300 for Assurance-enabled Linde Buzo Gray (ALBG) data clustering, according to an implementation of the present subject matter. The method 300 is implemented in computing device, such as a clustering system 100. The method 300 may be described in the general context of computer executable instructions. Generally, computer executable instructions may include routines, programs, objects, components, data structures, procedures, modules, functions, etc., that perform particular functions or implement particular abstract data types. The method 300 may also be practiced in a distributed computing environment where functions are performed by remote processing devices that are linked through a communications network.

The order in which the method 300 is described is not intended to be construed as a limitation, and any number of the described method blocks can be combined in any order to implement the method 300, or an alternative method. Furthermore, the method 300 can be implemented in any suitable hardware, software, firmware or combination thereof.

At block 302, the method 300 includes obtaining user model data or user data 122 from a database available to a processor 102 of the clustering system 100, where the user model data includes data elements represented by a plurality of data points in a multi-dimensional space, say n-dimensional space. In an example, the data elements correspond to features and feature values associated with individuals of an enterprise.

At block 304, the method includes obtaining a segmented data output 124 from the database, where the segmented data output 124 includes clusters of the data elements corresponding to users, for example, users of computing devices in an organization. The segmented data output 124 is obtained by segmenting the users in the user model data 122 for a predefined accuracy cluster criterion co-efficient of ponderation (CoP) value.

At block 306, the method 300 includes determining validity of the segmented data output 124 against pareto validity check. The pareto validity check is a standard principle or logic for analyzing or validating any segmented or clustered data output. In an example, the segmented data output 124 is determined 'valid' against the pareto validity check when 20% of the clusters contains 80% of the data elements of user model data 122.

At block 308, in case the segmented data output 124 is determined valid against the pareto validity check, the data elements of the user model data 122 are iteratively segmented into non-overlapping, increasingly refined, segmented clusters for a defined similarity cluster criterion, till the segmented clusters are determined valid against pareto validity check. In an example, the defined accuracy cluster criterion is co-efficient of ponderation (CoP) value. The CoP value signifies inaccuracy tolerance or factor of safety value on quality that the segmented clusters can exhibit. For instance, the CoP value of 0.01 signifies 99% of accuracy of segmented clusters.

At block 310, the method 300 includes performing quality assurance on the segmented clusters. The quality assurance is performed using silhouette co-efficient index. The silhouette co-efficient index, in general, refers to a method of interpretation and validation of data clusters. The silhouette co-efficient index provides a representation of how well each data element lies within its cluster. Further, the silhouette co-efficient index is also used to determine goodness quality of the segmented clusters created using the clustering system 100. In an implementation, the silhouette co-efficient index comprises one of a silhouette co-efficient index specific to user, a silhouette co-efficient index specific to cluster, and a global silhouette co-efficient index.

At block 312, the method 300 includes storing the segmented clusters resulting from the quality assurance as the segmented data output 124 in the database.

Test and Validation

In respect to the present subject matter, one existing clustering technique, i.e., Modified Linde Buzo Gray (MLBG) technique, is identified as a baseline technique to rate, compare, and contrast against the Assurance-enabled Linde Buzo Gray (ALBG) clustering technique described herein in accordance with the present subject matter. MLBG clustering technique is an unsupervised clustering method based upon LBG algorithm. MLBG technique automatically finds the number of clusters in a data set by an iterative process using intermediate results. A cluster maximizing "intra-cluster distance measure" is chosen for splitting iteratively. The acceptance of the split depends on if an evaluation criterion based on equation (2) is satisfied. This process is repeated until there are no valid partitions or split operation possible on the dataset.

Further, with reference to the clustering technique, there are few differences in considered parameters and clustering logic, as can be seen from below provided Table 2. One major difference with the ALBG clustering technique is that it offsets the need for seed value requirements.

TABLE 2

MLBG vs. ALGB clustering comparison

| Parameters | MLBG | ALBG |
| --- | --- | --- |
| Seed values required | Input file, max1, max2, max3, CoP | Input file |
| Segmentation module: Step B | Choice of the cluster to subdivide: From the set of M clusters we choose the cluster $C_k$ which has maximum DM. Output: cluster $C_k$ to be subdivided | User-segment or cluster Identification: The Super-set user-segment or cluster (primary) with maximum dispersion measure is identified to be bi partitioned. Output: cluster $C_k$ to be subdivided. |

TABLE 2-continued

MLBG vs. ALGB clustering comparison

| Parameters | MLBG | ALBG |
|---|---|---|
| Segmentation module: Step C | Choice of the germ points. Identifies 2 points from Ck to make M + 1 points G1, C2, . . . , CM, G2). G1 and G2 being the identified points [7, 8]. The germ points are determined by using the LBG [3] initialization method. The first germ point called G1 is taken as the centroid of the cluster Ck. The second one called G2 is the farthest point from the centroid for first attempt. For the next attempts it takes into account previous failures until the maximal value of max2 is not reached. For more details refer to [7]. Output: G1 and G2 | Fall-back referential user identification: A fall-back referential user from the user-segment (primary) to be bi-partitioned is identified. Fall-back referential user is the farthest user in the cluster from primary cluster centroid. This step is required to fix a referential secondary cluster head in addition to $C_k$. Output: FP |
| Segmentation module: Step D | Evolution of the partition with M to M + 1 clusters by using the K-means algorithm It uses K-means to classify the users of the set U from M to M + 1 clusters given the following set of M + 1 points (G1, C2, . . . , CM, G2) For all the users UJ in U, Uj is assigned to the closest point. Centroids are computed for {cent1, . . . , centM + 1} of obtained clusters, Repeat the step until stability of centroids or until maximal number of iterations max3 is reached. Output: Intermediate result: M + 1 clusters (C1, . . . , CM + 1) | Cluster: Cluster the primary segment using K-means clustering technique into two using the FP and centk. This step increments the number of clusters in the system by 1. Use K-means to split the cluster to be subdivided into two clusters Ck and CM + 1. Assign all the users Uj in Ck to the closest point between Ck or CM + 1. Centroid is computed for CM + 1. Repeat the step until centroid is stable for two iteration. Output: two clusters Ck and CM + 1. |
| Segmentation module: Step E | Evaluation of the partition with M to M + 1 clusters: if the evaluation criterion is satisfied, one goes back to Step a with M + 1 clusters, On the contrary, the choice of the germ points is first called into question until a maximal number of attempts (max2). If no germ points enable a valid partition, the choice of the cluster to subdivide is called into question until a maximal number of attempts (max1). If no clusters provide a valid partition, the optimal number of clusters is reached. | cluster validation: The split of primary clusters into two clusters is validated based on validation condition. This step is critical to achieve high quality cluster DM. if the evaluation criterion is satisfied, one goes back to Step B with M + 1 clusters, On the contrary, go to step C. If there is no fall back referential user we add Ck to unSplitableClusterId.and move to step B. |
| Pareto validation module | Though this module is not present in MLBG, we have included this module just to account result comparison between MLBG and our approach on normalized scale. | Validate the output(C and M) against Pareto hypothesis i.e., paretoCheck is valid if 20% of the clusters contains 80% of the users (clusters sorted with descending cluster size). |
| Qualitative assurance module | Though this module is not present in MLBG and it uses K-means (Step c) iteratively which minimizes the possibility of assigning a user in wrong cluster, for a measure of precaution we have included this module. | Provide qualitative assurance in our clustering approach to ensure that all the users are assigned to correct clusters. |

As can be appreciated by those skilled in the art, seed values captured in max1, max2, and max3 are dataset dependent in the MLBG clustering technique. However, in ALBG clustering technique described herein in accordance with the present subject matter, the need of seed values is eliminated, which makes the ALBG clustering technique more generic and self-adjustable.

In addition to the above provided theoretical comparison, the MLBG clustering technique and the ALBG clustering technique are executed for experimentation run on various public domain datasets and couple of realistic domain proprietary datasets (Data-1 and Data-2) with different CoP values. The experimentation run results for the MLBG clustering technique and the ALBG clustering technique are captured in the below provided Table 3.

TABLE 3

Results of experimentation run

| | | | MLBG | | ALBG | |
|---|---|---|---|---|---|---|
| Dataset [13] | Records X Feature Dimensions | CoP | Number of clusters M | Silhouette index coefficient | Number of clusters M | Silhouette index coefficient |
| Parkinsons | 197 X 23 | 0.01 | 29 | 0.93816 | 67 | 0.96804 |
| | | 0.1 | 15 | 0.92035 | 15 | 0.89945 |

TABLE 3-continued

Results of experimentation run

| Dataset [13] | Records X Feature Dimensions | CoP | MLBG | | ALBG | |
|---|---|---|---|---|---|---|
| | | | Number of clusters M | Silhouette index coefficient | Number of clusters M | Silhouette index coefficient |
| | | Pareto | 15 | 0.92035 | 13 | 0.96894 |
| | | | CoP = 0.1 | | CoP = 0.12 | |
| Breast Tissues | 197 X 23 | 0.01 | 55 | 0.97817 | 42 | 0.99184 |
| | | 0.1 | 12 | 0.89173 | 11 | 0.91238 |
| | | Pareto | N/A | — | 42 | 0.99184 |
| | | | | | CoP = 0.01 | |
| Blood transfusion | 748 X 5 | 0.01 | 1 | N/R | 114 | 0.82636 |
| | | 0.1 | 1 | N/R | 11 | 0.69793 |
| | | Pareto | N/A | — | N/A | — |
| Forrest Fires | 513 X 11 | 0.01 | 3 | 0.91840 | 77 | 0.94992 |
| | | 0.1 | 3 | 0.91840 | 17 | 0.93463 |
| | | Pareto | N/A | — | N/A | — |
| Cloud | 2053 X 10 | 0.01 | 115 | 0.78964 | 117 | 0.88513 |
| | | 0.1 | 2 | 0.68517 | 11 | 0.73709 |
| | | Pareto | N/A | — | 26 | 0.78422 |
| | | | | | CoP = 0.05 | |
| Real Data-1 | 45020 X 8 | 0.01 | 41 | 0.98217 | 42 | 0.99184 |
| | | 0.1 | 13 | 0.91197 | 12 | 0.92916 |
| | | Pareto | N/A | — | 6 | 0.88081 |
| | | | | | CoP = 0.17 | |
| Real Data-2 | 46445 X 6 | 0.01 | 8 | 0.98323 | 11 | 0.99835 |
| | | 0.1 | 8 | 0.98323 | 11 | 0.99835 |
| | | Pareto | N/A | — | N/A | — |

Note:
N/A is the case where pareto validity check is invalid for the first iteration segmentation result.
N/R is the case where we have only one cluster and silhouette calculation is not required.

As can be gathered from the Table 3, two values for CoP values, i.e., 0.01 and 0.1, are considered for the experimentation run. As described above, the number of clusters M and silhouette co-efficient index value achieved with the CoP value 0.01 is always higher than the CoP value 0.1, implying a higher accurate or quality outcome. With respect to user (data) segmentation domain requirements, the number of clusters M achieved with CoP value 0.01 is on a higher scale than what the domain would require to fix target solutions there upon. Hence, some abstraction are allowed in the experimentation run by means of reduction in the CoP value to reduce the number of clusters M that suits the domain principles, but with slight reduction to quality metric values.

Further, based on the results shown in Table 3, a few important inferences that could be deduced out from the experimentation run are as follows:

Number of Clusters

As can be seen from Table 3, a number of clusters M obtained with the ALBG clustering technique is close to the MLBG clustering technique on some dataset. For example, for datasets, Breast Tissues with CoP=0.1, the ALBG clustering technique gives 11 clusters whereas the MLBG clustering technique gives 12 clusters; however, silhouette co-efficient index is slightly better for the ALBG clustering technique than the MLBG clustering technique.

Further, for cloud dataset, 2 clusters are achieved with the MLBG clustering technique and 11 clusters with the ALBG clustering technique. The deviation is high, and the reason for this is number of distinct users or data elements in the cloud dataset. Data elements in the cloud dataset are generally different with respect to each other.

Silhouette Coefficient Index Value

As can be concluded from Table 3, the silhouette co-efficient index value obtained with the ALBG clustering technique is better (higher) compared with that obtained with the MLBG clustering technique for most of the datasets considered in the experimentation run. Further, the ALBG clustering technique gives an overall betterment of 0.16383 for CoP=0.01 and 0.03206 for CoP=0.1. (result analysis scope: datasets for which both the MLBG clustering technique and the ALBG clustering technique gives more than 5 clusters as outcomes). Yet further, the ALBG clustering technique gives an average betterment per dataset of 0.03276 for CoP=0.01 and 0.00802 for CoP=0.1 (result analysis scope: datasets for which both the MLBG clustering technique and the ALBG clustering technique gives more than 5 clusters as outcomes).

Experimentation Run Performance

As can be seen from Table 3, the experimentation run with the MLBG clustering technique on synthetic dataset-1 for CoP=0.01 has noticeable performance issues. The reason for such performance issue is due to operations performed in step B and step C of MLBG algorithm.

In an example, in step C of Table 2, the MLBG clustering technique initiates k-means clustering using M+1 points on complete dataset U, until a maximal value of max3 or a stability (cluster center does not change further) is reached. Especially, with the synthetic dataset-1, the number of users in the dataset being high, the MLBG clustering technique takes more processing time to arrive at stable clusters. Whereas, with the ALBG clustering technique, k-means technique is used only on 2 points (centroid and farthest point) for the users present in a cluster to be subdivided rather than performing on complete dataset U. This in turn reduces the number of operations and execution time. For instance, the experimentation run with the MLBG clustering technique consumes around 138 minutes to complete, while the experimentation run with the ALBG clustering technique consumes 7 minutes to complete.

Pareto 80-20 Distribution Hypothesis

Pareto check logic gives a social behavioral validity framework to the ALBG clustering technique of the present subject matter. The pareto validity check logic is added to the ALBG clustering technique to check if resulting cluster distribution depicts a pareto distribution. The pareto validity check logic is an additional and novel step in the ALBG clustering technique.

Datasets on which the pareto check logic is applied, it is found that the ALBG clustering technique gives better silhouette co-efficient index value with lowest CoP value (highest accuracy) as final output. Pareto distribution of 80-20 adherence is tracked for the ALBG clustering technique in Table 3.

Qualitative Assurance

Based on the results depicted in Table 3, with the ALBG clustering technique, it is determined that on an average 3.32% users were placed in incorrect clusters which were later corrected by the qualitative assurance mechanism of the ALBG clustering technique. (result analysis scope: runs for COP=0.1 and 0.01).

Overall

Based on the results depicted in Table 3, it can be determined that the CoP value is inversely proportional to the number of clusters M or the silhouette co-efficient index value. Further, it is also determined that the ALBG clustering technique outperforms the MLBG clustering technique with better quality scale results, i.e., with overall difference of 0.19589 and average difference of 0.02177.

Conclusion

In accordance with various implementations of the present subject matter, the ABLG clustering technique is described herein to arrive at initial k in the k-means clustering algorithm or technique. Further, with the implementations of the present subject matter, significant gains in terms of number of cluster controls and quality of clusters can be achieved by using the ALBG clustering technique.

Although embodiments for methods and systems for clustering multi-dimensional data have been described in a language specific to structural features and/or methods, it is to be understood that the present subject matter is not necessarily limited to the specific features or methods described. Rather, the specific features and methods are disclosed as exemplary embodiments for clustering multi-dimensional data.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for Assurance-enabled Linde Buzo Gray (ALBG) data clustering-based segmentation, the method comprising:
    obtaining, by a processor, a user model data from a database available to the processor, the user model data having data elements represented by a plurality of data points in a multi-dimensional space, wherein the data elements correspond to features and feature values associated with users;
    obtaining, by the processor, a segmented data output comprising clusters of the user model data of the users, wherein the data elements that belong to a same cluster are as similar as possible and the data elements of each cluster are as dissimilar as possible to the data elements of other clusters;
    determining, by the processor, validity of the segmented data output against pareto validity check;
    in response to determining the validity of the segmented data output, iteratively segmenting, by the processor, the data elements of the user model data into segmented clusters based on an accuracy cluster criterion, till the segmented clusters are determined valid against pareto validity check;
    storing, by the processor, the segmented clusters resulting from the iteratively segmenting as the segmented data output in the database;
    performing, by the processor, qualitative assurance of the segmented data output to ensure that each of the data elements is correctly assigned to the segmented clusters; and
    storing, by the processor, the qualitative assured segmented data output as a result of the qualitative assurance.

2. The method of claim 1, wherein the accuracy cluster criterion comprises a co-efficient of ponderation (CoP) value.

3. The method of claim 1, wherein the iterative segmenting comprising:
    initializing, by the processor, a defined CoP value for first iteration in the iterative segmentation of the user model data;
    incrementing, by the processor, the defined CoP value for each iteration in the iteratively segmenting of the data elements till the segmented clusters produced from latest iteration fails to satisfy pareto validity check; and storing, by the processor, the last segmented result valid against pareto validity check in the database as the segmented data output.

4. The method of claim 1, wherein in response to determining invalidity of the segmented data output against pareto validity check, the method comprising:

initializing, by the processor, a predetermined CoP value for segmenting of the user model data;

segmenting, by the processor, the data elements in user model data to segmented clusters; and storing, by the processor, the segmented clusters as the segmented data output.

5. The method of claim 4, wherein the predetermined CoP value is 0.1.

6. The method of claim 1, further comprising:

representing, by the processor, individuals in the form of the data elements using features along with respective feature values in the user model data.

7. The method of claim 6, further comprising:

identifying, by the processor, the cluster as a primary cluster to be segmented;

identifying, by the processor, a cluster centre of the primary cluster and a fall-back referential user point from the cluster centre;

based on the cluster centre and the fall-back referential user point, segmenting the primary cluster using k-means clustering technique into two clusters.

8. The method of claim 7, further comprising:

selecting, by the processor, a cluster from amongst the two clusters based on dispersion measures of the two clusters;

splitting, by the processor, the selected cluster into two further clusters; and repeating, by the processor, the selecting and the splitting until resulting clusters are determined to be unsplitable based on a validation criterion; and storing, by the processor, the resulting clusters as the segmented data output in the database.

9. The method of claim 1, wherein the segmented data output is determined valid against the pareto validity check when 20% of the clusters include 80% of the data elements of user data.

10. The method of claim 1, wherein performing qualitative assurance comprises determining a goodness quality of the segmented clusters using silhouette co-efficient index.

11. The method of claim 10, wherein the silhouette co-efficient index comprises one of silhouette co-efficient index specific to user, silhouette co-efficient index specific to cluster, and global silhouette co-efficient index.

12. A system for Assurance-enabled Linde Buzo Gray (ALBG) clustering-based segmentation, the system comprising:

a processor:

a user data module, coupled to the processor, to:

obtain a user model data from a database, the user model data comprising data elements represented by a plurality of data points in a multi-dimensional space, wherein the data elements correspond to features and feature values of users; and obtain a segmented data output comprising clusters of the user model data of the users, wherein the data elements that belong to a same cluster are as similar as possible and the data elements of each cluster are as dissimilar as possible to the data elements of other clusters;

a pareto validation module, coupled to the processor, to determine validity of the segmented data output against pareto validity check;

a segmentation module, coupled to the processor, to iteratively segment the data elements of the user model data into segmented clusters using an accuracy cluster criterion value, till the segmented clusters are determined valid against the pareto check; and a qualitative assurance module, coupled to the processor, to:

perform qualitative assurance of the segmented clusters to ensure that each of the data elements is correctly assigned to the segmented clusters; and store the qualitative assured segmented clusters as a result of the quality assurance.

13. A system of claim 12, wherein the accuracy cluster criterion comprises a co-efficient of ponderation (COP) value.

14. A system of claim 12, wherein the segmentation module is configured to represent users in the form of the data elements using features along with respective feature values in the user model data.

15. A computer program product having embodied thereon a computer program for Assurance-enabled Linde Buzo Gray (ALBG) clustering-based segmentation, the computer program product comprising:

obtaining a user model data from a database available to the processor, the user model data having data elements represented by a plurality of data points in a multi-dimensional space, wherein the data elements correspond to features and feature values associated with users;

obtaining a segmented data output comprising clusters of the user model data of the users, wherein the data elements that belong to a same cluster are as similar as possible and the data elements of each cluster are as dissimilar as possible to the data elements of other clusters;

determining validity of the segmented data output against pareto validity check;

in response to determining the validity of the segmented data output, iteratively segmenting the data elements of the user model data into segmented clusters based on an accuracy cluster criterion, till the segmented clusters are determined valid against pareto validity check; and storing the segmented clusters resulting from the iteratively segmenting as the segmented data output in the database.

* * * * *